United States Patent
Wang et al.

(10) Patent No.: US 10,261,636 B2
(45) Date of Patent: *Apr. 16, 2019

(54) TOUCH AND HOVER SENSING DEVICE

(71) Applicants: Tsinghua University, Beijing (CN); HON HAI PRECISION INDUSTRY CO., LTD., New Taipei (TW)

(72) Inventors: Xin-He Wang, Beijing (CN); Dong-Qi Li, Beijing (CN); Jiang-Tao Wang, Beijing (CN); Wen-Yun Wu, Beijing (CN); Yu-Jun He, Beijing (CN); Peng Liu, Beijing (CN); Qing-Yu Zhao, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 126 days.

This patent is subject to a terminal disclaimer.

(21) Appl. No.: 14/979,485

(22) Filed: Dec. 27, 2015

(65) Prior Publication Data

US 2016/0188043 A1    Jun. 30, 2016

(30) Foreign Application Priority Data

Dec. 31, 2014    (CN) .......................... 2014 1 0851712

(51) Int. Cl.
  *G06F 3/044*    (2006.01)
  *G06F 3/041*    (2006.01)
  *G06F 3/047*    (2006.01)

(52) U.S. Cl.
  CPC .............. *G06F 3/044* (2013.01); *G06F 3/047* (2013.01); *G06F 3/0416* (2013.01);
  (Continued)

(58) Field of Classification Search
  CPC . G06F 2203/04101; G06F 2203/04106; G06F 2203/04108; G06F 3/0416; G06F 3/044; G06F 3/047
  See application file for complete search history.

(56) References Cited

U.S. PATENT DOCUMENTS 8,502,786 B2    8/2013  Jiang et al.
8,614,693 B2   12/2013  King et al.
(Continued)

FOREIGN PATENT DOCUMENTS

CN        1381059         11/2002
CN      101937279 A        1/2011
(Continued)

*Primary Examiner* — Viet D Pham
(74) *Attorney, Agent, or Firm* — ScienBiziP, P.C.

(57) ABSTRACT

A touch and hover sensing device includes a sensing module, a hover sensing unit, a touch sensing unit, and a switching control unit switching between a hover mode and a touch mode. The sensing module includes a plurality of first electrostatic sensing elements and a plurality of second electrostatic sensing elements electrically insulated from each other and located on a surface of an insulating substrate. The plurality of first electrostatic sensing elements is spaced from each other and extends along a first direction, and the plurality of second electrostatic sensing elements is spaced from each other and extends along a second direction. Each first electrostatic sensing element and each second electrostatic sensing element includes a single walled carbon nanotube or few-walled carbon nanotube.

17 Claims, 4 Drawing Sheets

(52) U.S. Cl.
CPC .............. *G06F 2203/04101* (2013.01); *G06F 2203/04106* (2013.01); *G06F 2203/04108* (2013.01)

(56) References Cited

U.S. PATENT DOCUMENTS

| | | |
|---|---|---|
| 9,323,398 B2 | 4/2016 | Bernstein et al. |
| 2002/0183207 A1 | 12/2002 | Hjortstam et al. |
| 2008/0048996 A1* | 2/2008 | Hu .......................... G06F 3/044 345/174 |
| 2009/0153513 A1* | 6/2009 | Liu .......................... G06F 3/044 345/173 |
| 2009/0167711 A1* | 7/2009 | Jiang .................... G06F 3/0412 345/173 |
| 2010/0328258 A1 | 12/2010 | Cheng et al. |
| 2011/0304579 A1 | 12/2011 | Feng et al. |
| 2012/0050180 A1 | 3/2012 | King et al. |
| 2014/0013865 A1* | 1/2014 | White ....................... G01L 1/14 73/862.626 |
| 2014/0144766 A1* | 5/2014 | Feng ...................... H01H 1/027 200/600 |
| 2014/0145980 A1* | 5/2014 | Feng ...................... G06F 3/044 345/173 |
| 2014/0282239 A1* | 9/2014 | Locker ................. G06F 3/0482 715/810 |
| 2014/0340590 A1* | 11/2014 | Shih ........................ G06F 3/044 349/12 |

FOREIGN PATENT DOCUMENTS

| | | |
|---|---|---|
| CN | 102236439 A | 11/2011 |
| CN | 101859216 | 1/2012 |
| CN | 102483673 | 5/2012 |
| CN | 103168284 | 6/2013 |
| CN | 103235195 A | 8/2013 |
| TW | I416380 | 11/2013 |
| TW | M478871 | 5/2014 |
| WO | 2014009781 A1 | 1/2014 |

\* cited by examiner

TOUCH AND HOVER SENSING DEVICE

CROSS-REFERENCE TO RELATED APPLICATIONS

This application claims all benefits accruing under 35 U.S.C. § 119 from China Patent Application No. 201410851712.4, filed on Dec. 31, 2014, in the China Intellectual Property Office. This application is related to commonly-assigned application entitled, "TOUCH AND HOVER SENSING DEVICE", concurrently filed Ser. No. 14/979,481; "HOVER CONTROLLING DEVICE", concurrently filed Ser. No. 14/979,489; "HOVER CONTROLLING DEVICE", concurrently filed Ser. No. 14/979,490. Disclosures of the above-identified applications are incorporated herein by reference.

FIELD

The present application relates to a touch and hover sensing device.

BACKGROUND

Following the advancement in recent years of various electronic apparatuses, such as mobile phones, car navigation systems and the like, toward high performance and diversification, there has been continuous growth in the number of electronic apparatuses equipped with optically transparent touch panels at the front of their respective display devices (e.g., liquid crystal panels). A user of any such electronic apparatus operates it by pressing or touching the touch panel with a finger, a pen, stylus, or another like tool while visually observing the display device through the touch panel. Therefore, a demand exists for touch panels that provide superior visibility and reliable operation.

With the rapid development of electronic apparatuses, some touch panels need to also recognize a hover event, i.e., an object (hand or touch pen) near but not touching the touch panel, and the position of the hover event at the touch panel.

What is needed, therefore, is to provide a touch and hover sensing device.

BRIEF DESCRIPTION OF THE DRAWINGS

Implementations of the present technology will now be described, by way of example only, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
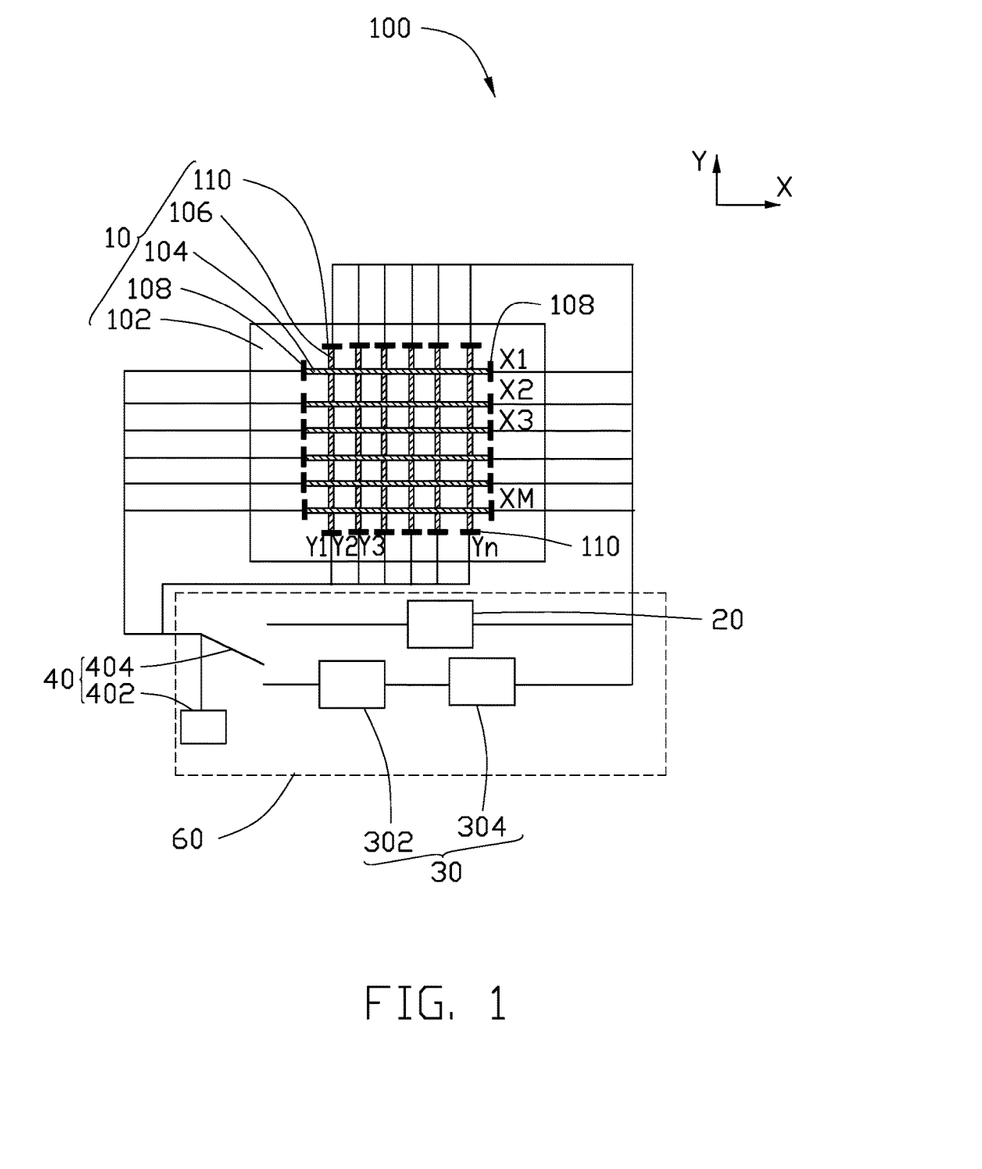
FIG. 1 is a schematic view of one embodiment of a touch and hover sensing device.

Referring to FIG. 1, a touch and hover sensing device 100 includes a sensing module 10, a touch sensing unit 20, a hover sensing unit 30, and a switching control unit 40. The touch sensing unit 20, the hover sensing unit 30, and the switching control unit 40 can form a touch and hover control system 60. A plurality of electrostatic sensing elements can be coupled to the touch and hover control system 60. The touch and hover control system 60 can control the switching control unit 40 switching between touch and hover modes. The touch and hover control system 60 can control the sensing module 10 switching between touch sensing unit 20 and hover sensing unit 30.

The sensing module 10 includes a substrate 102, a plurality of first electrostatic sensing elements 104, a plurality of second electrostatic sensing elements 106, a plurality of first electrodes 108, and a plurality of second electrodes 110. The plurality of first electrostatic sensing elements 104 and the plurality of second electrostatic sensing elements 106 are intersected with each other, to form a plurality of grids. The plurality of first electrostatic sensing elements 104 and the plurality of second electrostatic sensing elements 106 are electrically insulated from each other. The plurality of first electrostatic sensing elements 104 and the plurality of second electrostatic sensing elements 106 can be located on a surface of the substrate 102. In one embodiment, the plurality of first electrostatic sensing elements 104 and the plurality of second electrostatic sensing elements 106 are arranged in different planes. Each of the plurality of first electrostatic sensing elements 104 has a first end and a second end opposite to the first end. The first end is electrically connected to one first electrode 108, and the second end is electrically connected to one first electrode 108. Each of the plurality of second electrostatic sensing elements 106 has a third end and a fourth end opposite to the third end. The third end is electrically connected to one second electrode 110, and the fourth end is electrically connected to one second electrode 110.

A first direction X and a second direction Y, perpendicular to the first direction X, are defined on the surface of the substrate 102. The plurality of first electrostatic sensing elements 104 extends along the first direction X. The plurality of first electrostatic sensing elements 104 is spaced from each other and parallel to each other. The plurality of second electrostatic sensing elements 106 extends along the second direction Y. The plurality of second electrostatic sensing elements 106 is spaced from each other and parallel to each other. The plurality of first electrostatic sensing elements 104 can be located on the surface of the substrate 102, and the plurality of second electrostatic sensing elements 106 can be located on the plurality of first electrostatic sensing elements 104. A distance between two adjacent first electrostatic sensing elements 104 and a distance between two adjacent second electrostatic sensing elements 106 can be selected according to resolution ratio. The distance between two adjacent first electrostatic sensing elements 104 and a distance between two adjacent second electrostatic sensing elements 106 can be in a range from about 2 millimeters to about 2 centimeters.

The touch sensing unit 20 can be electrically connected to the plurality of first electrodes 108 and the plurality of second electrodes 110 by conductive wire, in order to make the touch sensing unit 20 electrically connect to the plurality of first electrostatic sensing elements 104 and the plurality of second electrostatic sensing elements 106. The touch sensing unit 20 can sense capacitive signals formed by touching the plurality of first electrostatic sensing elements 104 and the plurality of second electrostatic sensing elements 106 by using finger or touch pen. The capacitive signals can be formed by touching a protecting layer coating the plurality of first electrostatic sensing elements 104 and the plurality of second electrostatic sensing elements 106. The alternating current voltages are applied to the plurality of first electrostatic sensing elements 104 and the plurality of second electrostatic sensing elements 106. The sensing module 10 can sense the position coordinate of a sensed object according to capacitance changes of the plurality of first electrostatic sensing elements 104 and the plurality of second electrostatic sensing elements 106.

The hover sensing unit 30 includes a circuit control element 302 and a current detect element 304. The hover sensing unit 30 can be electrically connected to the plurality of first electrodes 108 and the plurality of second electrodes 110 by conductive wire, in order to make the hover sensing unit 30 electrically connect to the plurality of first electrostatic sensing elements 104 and the plurality of second electrostatic sensing elements 106. The sensing module 10 can sense the position coordinate of the sensed object according to resistances changes of the plurality of first electrostatic sensing elements 104 and the plurality of second electrostatic sensing elements 106.

A direct voltage is applied to the plurality of first electrostatic sensing elements 104 and the plurality of second electrostatic sensing elements 106 by the hover sensing unit 30. The currents of the plurality of first electrostatic sensing elements 104 and the plurality of second electrostatic sensing elements 106 are detected, and outputted as current signals. In detail, the circuit control element 302 can be electrically connected to the current detect element 304 by conductive wire. A direct voltage can be applied to the plurality of first electrostatic sensing elements 104 and the plurality of second electrostatic sensing elements 106 by the circuit control element 302. The current detect element 304 can detect the currents of the plurality of first electrostatic sensing elements 104 and the plurality of second electrostatic sensing elements 106. Thus, the resistance variations of the plurality of first electrostatic sensing elements 104 and the plurality of second electrostatic sensing elements 106 can be detected.

The switching control unit 40 includes a controller 402 and a switch 404. The sensing module 10 can be coupled to each of the touch sensing unit 20 and the hover sensing unit 30 by the switch 404. In touch sensing mode, the switch 404 can couple the sensing module 10 to the touch sensing unit 20 to process a touch signal. In hover sensing mode, the switch 404 can couple the sensing module 10 to the hover sensing unit 30 to process a hover signal.

The switching control unit 40 can be a control chip. The control chip can control the sensing module 10 working, to sense the position coordinate of the sensed object. The controller 402 can control the switch 404 according to any suitable control scheme. In one embodiment, the controller 402 can switch between the hover sensing mode and the touch sensing mode in response to a timer, where the switching occurs when the timer expires. At that point, the timer can be reset to count down to the next switching. In one embodiment, the controller 402 can switch between the hover sensing mode and the touch sensing mode in response to an input, such as a manual input from a user or a logical input from the device when a particular condition occurs. In another embodiment, the switching control unit 40 doesn't include the switch 404, and the switching control unit 40 is a filter. The filter can separate direct current signal and alternating current signal. The filter can transmit the direct current signal to the sensing module 10, and the sensing module 10 is controlled to sense a hover signal from the sensed object. The filter can transmit the alternating current signal to the sensing module 10, and the sensing module 10 is controlled to sense a touch signal from the sensed object.

The substrate 102 can be flat or curved to support other elements. The substrate 102 can be insulating and transparent. The substrate 102 can be also opaque. The substrate 102 can be made of rigid materials such as glass, quartz, diamond, plastic or any other suitable material. The substrate 102 can also be made of flexible materials such as polycarbonate (PC), polymethyl methacrylate acrylic (PMMA), polyimide (PI), polyethylene terephthalate (PET), polyethylene (PE), polyether polysulfones (PES), polyvinyl polychloride (PVC), benzocyclobutenes (BCB), polyesters, or acrylic resin. A shape and size of the substrate 102 can be selected according to need. In one embodiment, a thickness of the substrate 102 is less than 1 millimeter. In one embodiment, the substrate 102 is a flat quartz plate, the area of the substrate 102 is 2 centimeters×2 centimeters, the thickness of the substrate 102 is 0.8 millimeters.

The plurality of first electrostatic sensing elements 104 and the plurality of second electrostatic sensing elements 106 can be one-dimensional semiconducting linear structure in nanoscale with single crystal structure. A diameter of the one-dimensional semiconducting linear structure in nanoscale can be less than 100 nanometers. When an sensed object with electrostatic near but does not touch the plurality of first electrostatic sensing elements 104 and the plurality of second electrostatic sensing elements 106, the resistances of the plurality of first electrostatic sensing elements 104 and the plurality of second electrostatic sensing elements 106 can be changed. The resistance changes can be obtained by detecting current change signals of the plurality of first electrostatic sensing elements 104 and the plurality of second electrostatic sensing elements 106.

The one-dimensional semiconducting linear structure in nanoscale can be a semiconducting linear structure with larger length diameter ratio. The length diameter ratio of the one-dimensional semiconducting linear structure in nanoscale is greater than 1000:1.

Figure 2:
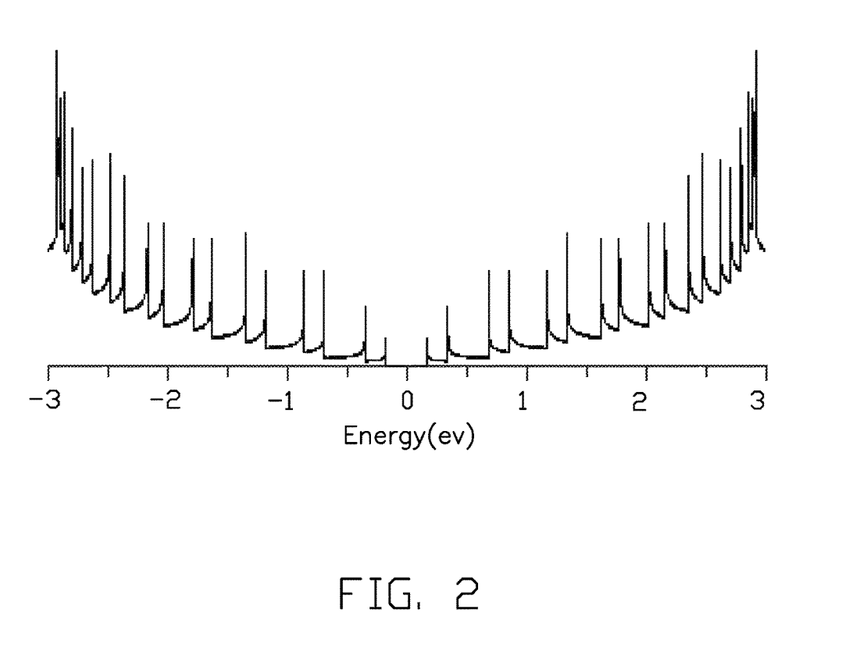
FIG. 2 is an electron density of state distribution curve of a carbon nanotube.

As shown in FIG. 2, the state density distribution curve of the carbon nanotube has a lot of singularities. The state density of the carbon nanotube takes great value at the point of the singularity. Distribution of singularities is relatively symmetrical to 0 eV place. In an ideal state without making any doping, the Fermi level locates on 0 eV place. The above properties are all one-dimensional semiconducting linear structure in nanoscale common characteristics. As previously mentioned, sensitive response to the electrostatic requires Fermi surface moving in the vicinity of the singularity of one-dimensional semiconducting linear structure in nanoscale. So that there is a need to make the Fermi level to raise or decrease to the neighborhood singularity nearest to 0 eV.

Figure 3:
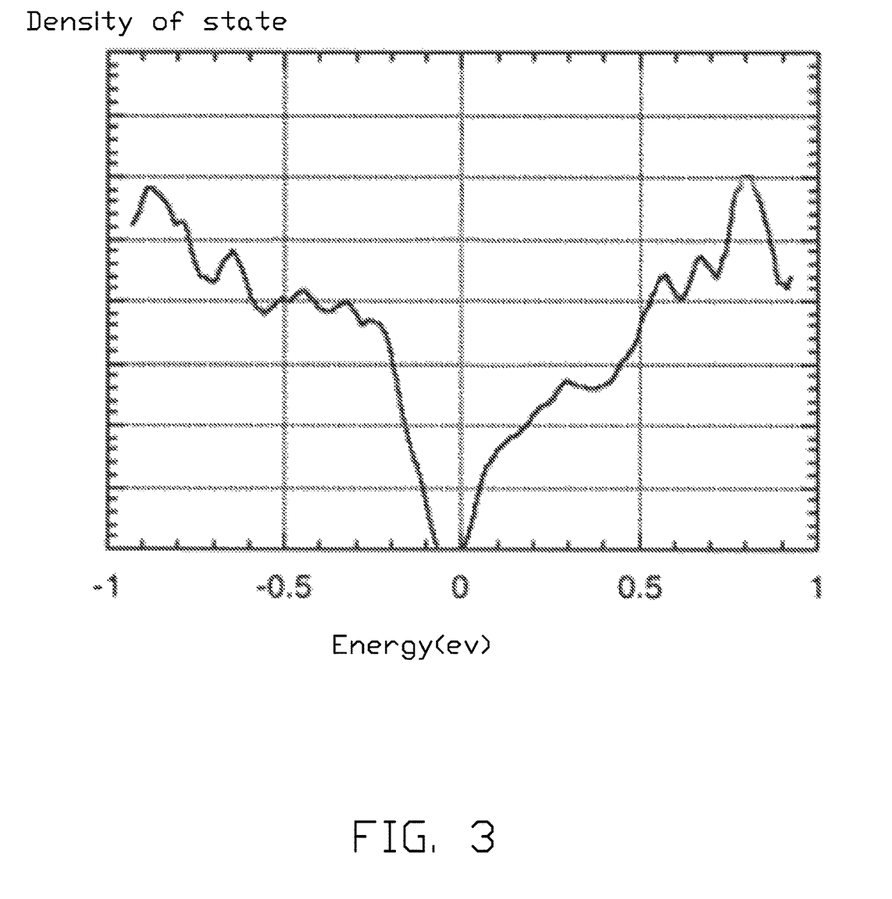
FIG. 3 is an electron density of state distribution curve of carbon nanotube under normal temperature measured by Scanning tunneling spectroscopy (STS).

Referring to FIG. 3, in practice, due to the thermal excitation, surface adsorption and interaction with the surrounding environment, the singularity of one-dimensional semiconducting linear structure in nanoscale will be broadened into a half-height peak with a width L. The peaks are always to be buried because the overlap of the peaks. But, the rising edge of peak singularity nearest 0 eV is always present. To make the one-dimensional semiconducting linear structure in nanoscale having electrostatic sensitive response, the Fermi surface needs to be fixed at a place with a distance to the singularity less than L/2. In practical applications, to obtain sensitive response to the electrostatic, through natural doping, doping and other artificial materials to make the distance between the Fermi surface and the singularity of the one-dimensional semiconducting linear structure in nanoscale within a range of 30 meV~300 meV.

Carbon nanotubes prepared sample exposed to the air, since the formation of oxygen adsorbed p-type doped, the distance from the Fermi surface to singular points in the state density falls within 30~300 meV, preferably 60 to fall within 100 meV. Therefore, thereby preparing natural carbon nanotubes have electrostatic sensitive response. Graphene strips, semiconducting nanowires (e.g. silicon nanowires) can adsorb oxygen to form a p-type doping. A doping can also be used to adjust distance between the Fermi surface and the singular point in the state density within a distance of 30~300 meV.

When the sensed object with static electricity nears the one-dimensional material semiconducting linear structure in nanoscale, the electric potential raise, thus the Fermi level of the one-dimensional semiconducting linear structure in nanoscale would be modulated, the corresponding density of states will change, and the conductivity change. Therefore, when considering the sensitivity of the process, we need to focus on two things: first, modulation efficiency of the sensed object to the Fermi level of the one-dimensional semiconducting linear structure in nanoscale; second, the change rate of the density of states with the Fermi level moving of the one-dimensional semiconducting linear structure in nanoscale.

On the first point, it is strongly influenced by the substrate, the surface adsorption and other environmental factors. It is impossible to quantitatively determine the modulation efficiency of the sensed object to the Fermi level of the one-dimensional semiconducting linear structure in nanoscale theoretically. The modulation efficiency of the sensed object to the Fermi level of the one-dimensional semiconducting linear structure can only be obtained from experimental measurements. For example, the modulation efficiency of the carbon nanotube located on a silica substrate is measured, and the modulation efficiency of the carbon nanotube located on a silica substrate is $4 \times 10^{-5}$. The second point is a requirement about the one-dimensional semiconducting linear structure in nanoscale, which requires the absolute value of $(d\sigma/dE_F)/(\sigma/E_F)$ greater than $10^{-1}$, or greater than $10^{-3}$ ($\sigma$ is the conductivity of the one-dimensional semiconducting linear structure in nanoscale, $E_F$ is the Fermi surface location of the one-dimensional semiconducting linear structure in nanoscale). In this condition, when the sensed objection is close to the one-dimensional semiconducting linear structure in nanoscale, the conductivity change is not less than 10% in favor to signal detection.

When using carbon nanotubes with the diameter distribution of 2-3 nm (carbon nanotubes are located on a silica substrate), the conductivity of the carbon nanotubes reduce by half ($d\sigma/\sigma \sim \frac{1}{2}$), when a sensed object with electrostatic 1000V is close to the carbon nanotubes at a place 0.5 meter far from the carbon nanotubes. The modulation efficiency is measured as $4 \times 10^{-5}$, $dE_F \sim 40$ meV. $E_F$ of the carbon nanotubes is $E_F \sim 150$ meV. Thus, the absolute value of $(d\sigma/dE_F)/(\sigma/E_F)$ of the carbon nanotubes is about 2. The graphene strips, the semi-conductive nano-wires can satisfy the requirement of $(d\sigma/dE_F)/(\sigma/E_F)$ greater than $10^{-1}$, or greater than $10^{-3}$. If it is just to achieve a qualitative sense the presence or absence of the sensed object with static electricity, $(d\sigma/dE_F)/(\sigma/E_F)$ of one-dimensional semiconducting linear structure in nanoscal is greater than $10^{-3}$. If it is to quantify the amount of sensing electrostatic or sense the position of the sensed object with static electricity, $(d\sigma/dE_F)/(\sigma/E_F)$ of one-dimensional semiconducting linear structure in nanoscal is greater than $10^{-1}$.

Each of the plurality of first electrostatic sensing elements 104 and each of the plurality of second electrostatic sensing elements 106 can be semiconducting graphene strips with a width of less than 10 nanometers, a thickness of less than 5 nanometers, and a length of great than 1 centimeter. Each of the plurality of first electrostatic sensing elements 104 and the plurality of second electrostatic sensing elements 106 can be one semiconducting silicon nanowire with a diameter of less than 5 nanometers, and a length of greater than 1 centimeter. Each of the plurality of first electrostatic sensing elements 104 and each of the plurality of second electrostatic sensing elements 106 can be one ultra long single walled carbon nanotube or few-walled carbon nanotube. The few-walled carbon nanotube is a carbon nanotube with wall of from about two layers to about six layers. In one embodiment, the few-walled carbon nanotube has two or three layers wall.

One single walled carbon nanotube or a single few-walled carbon nanotube is a quasi-one-dimensional structure. The smaller the diameter of the quasi-one-dimensional structure is, the density of states (DOS) of the quasi-one-dimensional structure is greater. The greater the DOS of the quasi-one-dimensional structure is, the shielding effect of the quasi-one-dimensional structure is smaller. The smaller the shielding effect of the quasi-one-dimensional structure is, the sensibility of sensing static electricity of the quasi-one-dimensional structure is greater. Therefore, the smaller the diameter of the single walled carbon nanotube or the few-walled carbon nanotube is, the sensibility of sensing position coordinate of the sensed object is greater.

The diameter of the single walled carbon nanotube or the few-walled carbon nanotube can be less than about 5 nanometers. In one embodiment, the diameter of the single walled carbon nanotube or the few-walled carbon nanotube is in a range from about 2 nanometers to about 5 nanometers. The ultra long single walled carbon nanotube or few-walled carbon nanotube can have a length greater than 1 centimeter. In one embodiment, the plurality of first electrostatic sensing elements 104 and the plurality of second electrostatic sensing elements 106 are single walled carbon nanotubes or few-walled carbon nanotubes with diameter of about 2 nanometers and length of about 2 centimeters. The single walled carbon nanotubes or few-walled carbon nanotubes can be made by a known method of adopting a "kite-mechanism". An example of the "kite-mechanism" is disclosed in Publication No. US20130252405A1.

The plurality of first electrostatic sensing elements 104 and the plurality of second electrostatic sensing elements 106 can be adhered on the surface of the substrate 102 by an insulating adhesive. The insulating adhesive can be coated on whole surface of the plurality of first electrostatic sensing elements 104, and the plurality of second electrostatic sensing elements 106 can cover the insulating adhesive. The insulating adhesive can only be located on portions of the plurality of first electrostatic sensing elements 104 intersected with the plurality of second electrostatic sensing elements 106. In one embodiment, the insulating adhesive is only located on the portions of the plurality of first electrostatic sensing elements 104 intersected with the plurality of second electrostatic sensing elements 106.

The plurality of first electrodes 108 and the plurality of second electrodes 110 can be made of a conductive material, such as metal, conductive polymer, conductive adhesive, metallic carbon nanotubes, or indium tin oxide (ITO). The plurality of first electrodes 108 and the plurality of second electrodes 110 can be made by a method such as screen printing, chemical vapor deposition, or magnetron sputtering. In one embodiment, the material of the plurality of first electrodes 108 and the plurality of second electrodes 110 is ITO.

The touch and hover sensing device 100 further includes a protecting layer (not illustrated) covering the plurality of first electrostatic sensing elements 104, the plurality of second electrostatic sensing elements 106, the plurality of first electrodes 108, and the plurality of second electrodes 110, to protect the sensing module 10. The material of the protecting layer is insulating and transparent, such as polyethylene (PE), polycarbonate (PC), polyethylene terephthalate (PET), polymethyl methacrylate acrylic (PMMA), or thin glass.

In touch sensing mode, the protecting layer of the touch and hover sensing device 100 is pressed/touched with one sensed object, such as user's finger or touch pen, to form one or several different touch points on the protecting layer. And accordingly, capacitances of projections of the plurality of first electrostatic sensing elements 104 intersect with the plurality of second electrostatic sensing elements 106 are changed. The touch sensing unit 20 can sense the capacitive changes and convert the capacitive changes to touch signal. The X and Y coordinates of the touch points can be identified by the touch signal. The position coordinates of the touch points can be simultaneously identified.

In hover sensing mode, when one sensed object, such as user's finger or touch pen, near but does not touch the protecting layer of the touch and hover sensing device 100, resistances of the plurality of first electrostatic sensing elements 104 and the plurality of second electrostatic sensing elements 106 will be changed. The resistances are changed because of influence of band gap structure in the single walled carbon nanotube or few-walled carbon nanotube. The resistance changes make the currents of the plurality of first electrostatic sensing elements 104 and the plurality of second electrostatic sensing elements 106 to change. The resistance changes of the plurality of first electrostatic sensing elements 104 and the plurality of second electrostatic sensing elements 106 can be obtained by detecting current changes of the plurality of first electrostatic sensing elements 104 and the plurality of second electrostatic sensing elements 106 by the current detect element 304.

A current changed value of individual first electrostatic sensing element 104 is related to a distance between the sensed object and individual first electrostatic sensing element 104. The smaller the distance between the sensed object and individual first electrostatic sensing element 104 is, the current changed value of individual first electrostatic sensing element 104 is greater. A current changed value of individual second electrostatic sensing element 106 is related to a distance between the sensed object and individual second electrostatic sensing element 106. The smaller the distance between the sensed object and individual second electrostatic sensing element 106 is, the current changed value of individual second electrostatic sensing element 106 is greater.

The current changed values of the plurality of first electrostatic sensing elements 104 are different from each other, because the distances between the sensed object and each of the plurality of first electrostatic sensing elements 104 are different. The current changed value of the first electrostatic sensing element 104 closest to the sensed object is the largest, because the smaller the distance between the sensed object and individual second electrostatic sensing element 106 is, the current changed value of individual second electrostatic sensing element 106 is greater. Similarly, the current changed value of the second electrostatic sensing element 106 closest to the sensed object is the largest. The current changed values of the plurality of first electrostatic sensing elements 104 and the plurality of second electrostatic sensing elements 106 can be detected by the current detect element 304 and outputted as output signals. Therefore, the distribution of the current changes of the plurality of first electrostatic sensing elements 104 and the plurality of second electrostatic sensing elements 106 is obtained.

The method for detecting the sensed object in hover sensing mode is explained in detail. The plurality of first electrostatic sensing elements 104 is labeled by $X_m$ according to an arranging order of the plurality of first electrostatic sensing elements 104. The m is a positive integer. The plurality of first electrostatic sensing elements 104 is electrically connected to the hover sensing unit 30 by conductive wires. When the voltage is applied to the plurality of first electrostatic sensing elements 104, the currents of the plurality of first electrostatic sensing elements 104 are detected.

The plurality of second electrostatic sensing elements 106 is labeled by $Y_n$ according to an arranging order of the plurality of second electrostatic sensing elements 106. The n is a positive integer. The plurality of second electrostatic sensing elements 106 is electrically connected to the hover sensing unit 30 by conductive wires. When the voltage is applied to the plurality of second electrostatic sensing elements 106, the currents of the plurality of second electrostatic sensing elements 106 are detected.

The direct voltages are simultaneously applied to each first electrostatic sensing element 104 and each second electrostatic sensing element 106 by the circuit control element 302. When the sensed object nears but does not touch the touch and hover sensing device 100, currents of the plurality of first electrostatic sensing elements 104 and the plurality of second electrostatic sensing elements 106 will be changed because of influence of band gap structure in the single walled carbon nanotube or the few-walled carbon nanotube. The current detect element 304 can detect the current changes of the plurality of first electrostatic sensing elements 104 along the second direction Y and the first direction X. The current detect element 304 can detect the current changes of the plurality of second electrostatic sensing elements 106 along the second direction Y and the first direction X.

The current change values of the plurality of first electrostatic sensing elements 104 are defined as IXm. Thus, m current change values can be obtained, such as $IX_1$, $IX_2$, $IX_3$, ..., IXm. The current change values of the plurality of second electrostatic sensing elements 106 are defined as IYn. Thus, n current change values can be obtained, such as $IY_1$, $IY_2$, $IY_3$, ..., RYn.

The current changed value of the first electrostatic sensing element 104 closest to the sensed object is the largest. The first electrostatic sensing element 104 closest to the sensed object can be known according to the largest current change value of first electrostatic sensing element 104. Thus, the distance between the sensed object and the first electrostatic sensing element 104 closest to the sensed object can be known, and accordingly, the position of the sensed object in the second direction Y can be known, and Y coordinate of the sensed object can be known.

The current changed value of the second electrostatic sensing element 106 closest to the sensed object is the largest. The second electrostatic sensing element 106 closest to the sensed object can be known according to the largest current change value of second electrostatic sensing element 106. Thus, the distance between the sensed object and the second electrostatic sensing element 106 closest to the sensed object can be known, and accordingly, the position of the sensed object in the second direction X can be known, and X coordinate of the sensed object can be known. The position of the sensed object can be obtained according to Y coordinate and X coordinate of the sensed object. An electrical device including the touch and hover sensing device 100 can be controlled by the position coordinates of the sensed object, after determining the position coordinates of the sensed object. When a distance between the sensed object and the top surface of the sensing module 10 is in a range from about 0.5 centimeters to about 1 centimeter, the sensing module 10 can sense the position coordinate of the sensed object.

The touch and hover sensing device 100 can distinguish the moving of touch pen or gesture. The moving of touch pen or gesture can achieve transmission of instruction, and accordingly, achieve operation of electrical device including the touch and hover sensing device 100. The electrical device can be display or switch. Multi-touch control and multi-hover control can be achieved by adjusting driving mode and computational method. A Z direction of position of the sensed object can be determined by analysing signal strength.

Figure 4:
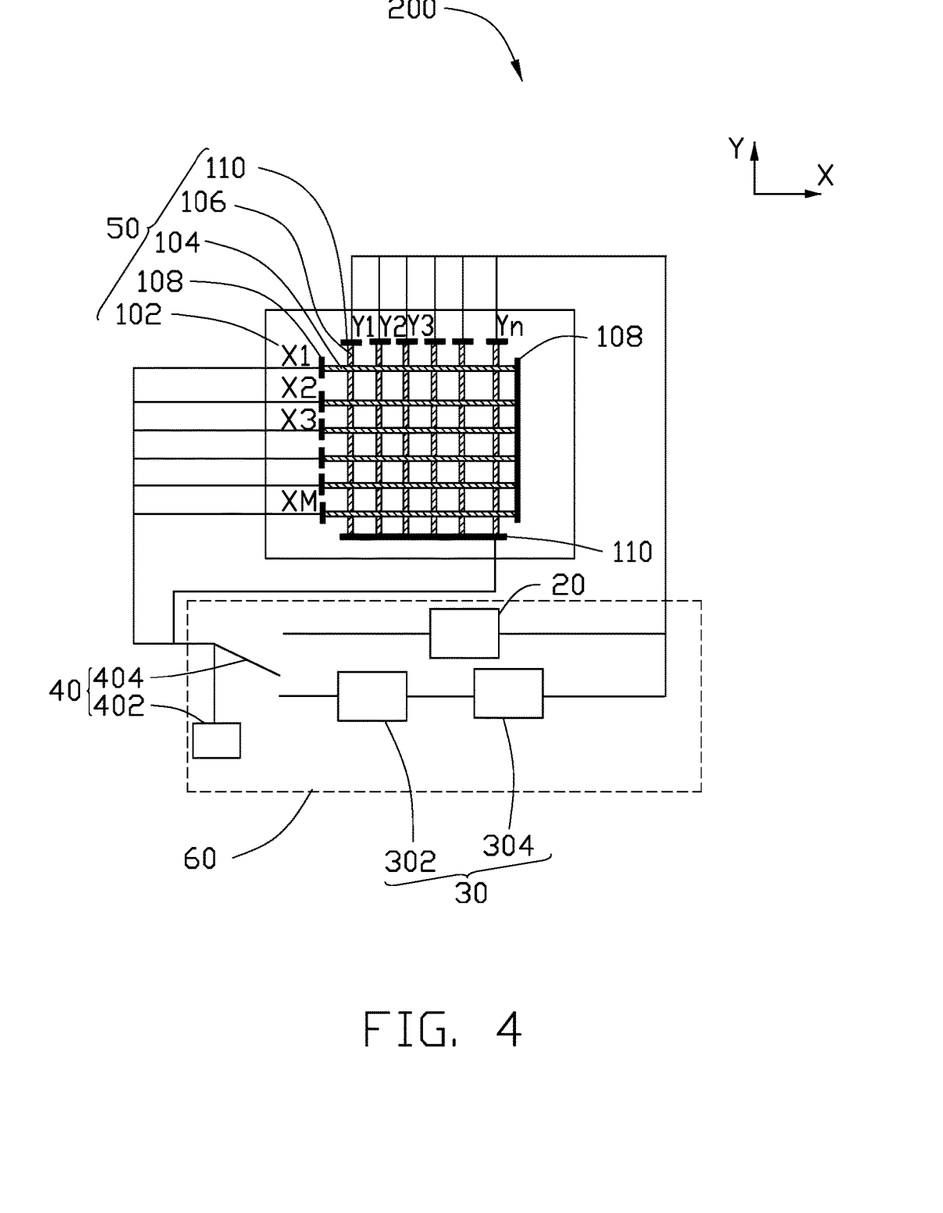
FIG. 4 is a schematic view of another embodiment of a touch and hover sensing device.

Referring to FIG. 4, an embodiment of a touch and hover sensing device 200 is shown where the plurality of first electrostatic sensing elements 104 have a first end and a second end opposite to the first end, the first end of each first electrostatic sensing element 104 is respectively electrically connected to one first electrode 108, and the second ends of all first electrostatic sensing element 104 is electrically connected together to one first electrode 108. The plurality of second electrostatic sensing elements 106 have a third end and a forth end opposite to the third end, the third end of each second electrostatic sensing element 106 is respectively electrically connected to one second electrode 110, and the forth ends of all second electrostatic sensing element 106 is electrically connected together to one second electrode 110.

In summary, the touch and hover sensing device 100 can detect touch action and hover action according to direct current signal and alternating current signal.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Additionally, it is also to be understood that the above description and the claims drawn to a method may include some indication in reference to certain steps. However, the indication used is only to be viewed for identification purposes and not as a suggestion as to an order for the steps.

What is claimed is:

1. A touch and hover sensing device, comprising:
  a sensing module comprising:
    a plurality of first electrostatic sensing elements;
    a plurality of second electrostatic sensing elements electrically insulated from the plurality of first electrostatic sensing elements;
    a plurality of first electrodes being metal electrodes; and
    a plurality of second electrodes being metal electrodes;
    wherein the plurality of first electrostatic sensing elements is spaced from each other and extends along a first direction, and the plurality of second electrostatic sensing elements is spaced from each other and extends along a second direction;
    each of the plurality of first electrostatic sensing elements and each of the plurality of second electrostatic sensing elements comprises a single walled carbon nanotube or few-walled carbon nanotube;
    each of the plurality of first electrostatic sensing elements has a first end and a second end opposite to the first end, one of the plurality of first electrodes is in direct contact with the first end, and another one of the plurality of first electrodes is in direct contact with the second end; and
    each of the plurality of second electrostatic sensing elements has a third end and a fourth end opposite to the third end, one of the plurality of second electrodes is in direct contact with the third end, and another one of the plurality of second electrodes is in direct contact with the fourth end;
  a hover sensing unit coupled to the sensing module, wherein resistances of the plurality of first electrostatic sensing elements and the plurality of second electrostatic sensing elements are changed when a sensed object with static electricity hovers;
  a touch sensing unit coupled to the sensing module, wherein capacitances of the plurality of first electrostatic sensing elements and the plurality of second electrostatic sensing elements are variable; and a switching control unit configured to control the hover sensing unit and the touch sensing unit.

2. The touch and hover sensing device of claim 1, wherein the few-walled carbon nanotube is a carbon nanotube, and the number of walls of the carbon nanotube ranges from two to six.

3. The touch and hover sensing device of claim 1, wherein a distance between two adjacent first electrostatic sensing elements and a distance between two adjacent second electrostatic sensing elements are in a range from about 2 millimeters to about 2 centimeters.

4. The touch and hover sensing device of claim 1, wherein a distance between the sensed object and a top surface of the sensing module is in a range from about 0.5 centimeters to about 1 centimeter.

5. The touch and hover sensing device of claim 1, wherein the touch sensing unit is configured to determine a position coordinate of the sensed object by sensing a distribution of capacitance values of the plurality of first electrostatic sensing elements and the plurality of second electrostatic sensing elements.

6. The touch and hover sensing device of claim 1, wherein the hover sensing unit is configured to determine a position coordinate of the sensed object by sensing a distribution of current values of the plurality of first electrostatic sensing elements and the plurality of second electrostatic sensing elements.

7. The touch and hover sensing device of claim 1, wherein the single walled carbon nanotube or the few-walled carbon nanotube has a diameter of less than 5 nanometers, and a length of greater than 1 centimeter.

8. The touch and hover sensing device of claim 1, wherein the second direction is perpendicular to the first direction.

9. The touch and hover sensing device of claim 1, wherein the plurality of first electrostatic sensing elements is parallel to each other, and the plurality of second electrostatic sensing elements is parallel to each other.

10. The touch and hover sensing device of claim 1, wherein the switching control unit is configured to control an electrical connection between the sensing module and the hover sensing unit.

11. The touch and hover sensing device of claim 1, wherein the switching control unit is configured to control an electrical connection between the sensing module and the touch sensing unit.

12. The touch and hover sensing device of claim 1, wherein the switching control unit comprises a controller and a switch.

13. The touch and hover sensing device of claim 1, wherein the hover sensing unit comprises a circuit control element and a current detect element.

14. A touch and hover sensing device, comprising:
a sensing module comprising:
a plurality of first electrostatic sensing elements;
a plurality of second electrostatic sensing elements electrically insulated from the plurality of first electrostatic sensing elements;
a plurality of first electrodes; and
a plurality of second electrodes;
wherein the plurality of first electrostatic sensing elements is spaced from each other and extends along a first direction, and the plurality of second electrostatic sensing elements is spaced from each other and extends along a second direction;
each of the plurality of first electrostatic sensing elements and each of the plurality of second electrostatic sensing elements comprise a single walled carbon nanotube or a few-walled carbon nanotube, and the few-walled carbon nanotube is a carbon nanotube with two walls to six walls;
each of the plurality of first electrostatic sensing elements has a first end and a second end opposite to the first end, one of the plurality of first electrodes is in direct contact with the first end, and another one of the plurality of first electrodes is in direct contact with the second end; and
each of the plurality of second electrostatic sensing elements has a third end and a fourth end opposite to the third end, one of the plurality of second electrodes is in direct contact with the third end, and another one of the plurality of second electrodes is in direct contact with the fourth end;
a hover sensing unit coupled to the sensing module, wherein resistances of the plurality of first electrostatic sensing elements and the plurality of second electrostatic sensing elements are variable;
a touch sensing unit coupled to the sensing module, wherein capacitances of the plurality of first electrostatic sensing elements and the plurality of second electrostatic sensing elements are variable; and
a switching control unit configured to control the hover sensing unit and the touch sensing unit.

15. The touch and hover sensing device of claim 14, wherein the resistances of the plurality of first electrostatic sensing elements and the plurality of second electrostatic sensing elements are changed in process of the sensed object near.

16. The touch and hover sensing device of claim 14, wherein the hover sensing unit is configured to determine a position coordinate of a sensed object by sensing a distribution of current values of the plurality of first electrostatic sensing elements and the plurality of second electrostatic sensing elements.

17. The touch and hover sensing device of claim 14, wherein each of the plurality of first electrostatic sensing elements is one single walled carbon nanotube or one few-walled carbon nanotube, and each of the plurality of second electrostatic sensing elements is one single walled carbon nanotube or one few-walled carbon nanotube.

* * * * *